Jan. 24, 1939.  D. H. KYLE  2,144,984
BACKLASH SNUBBER
Filed Jan. 30, 1937
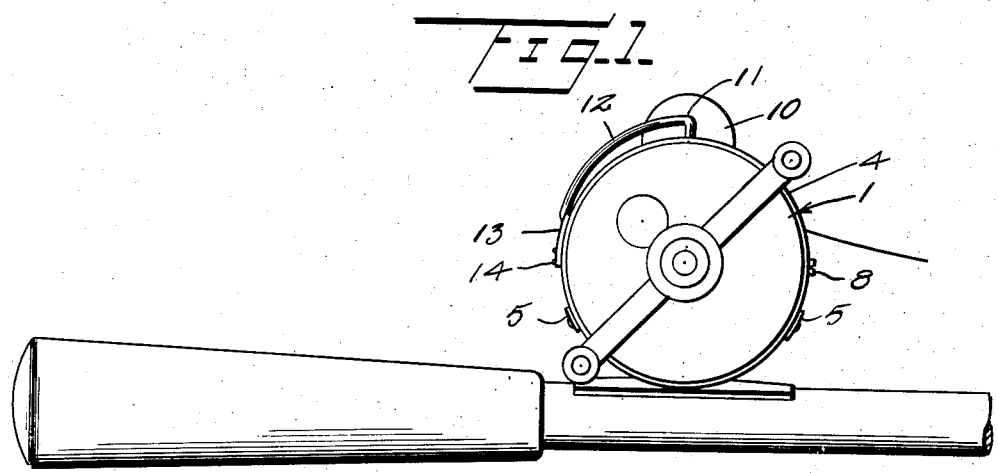
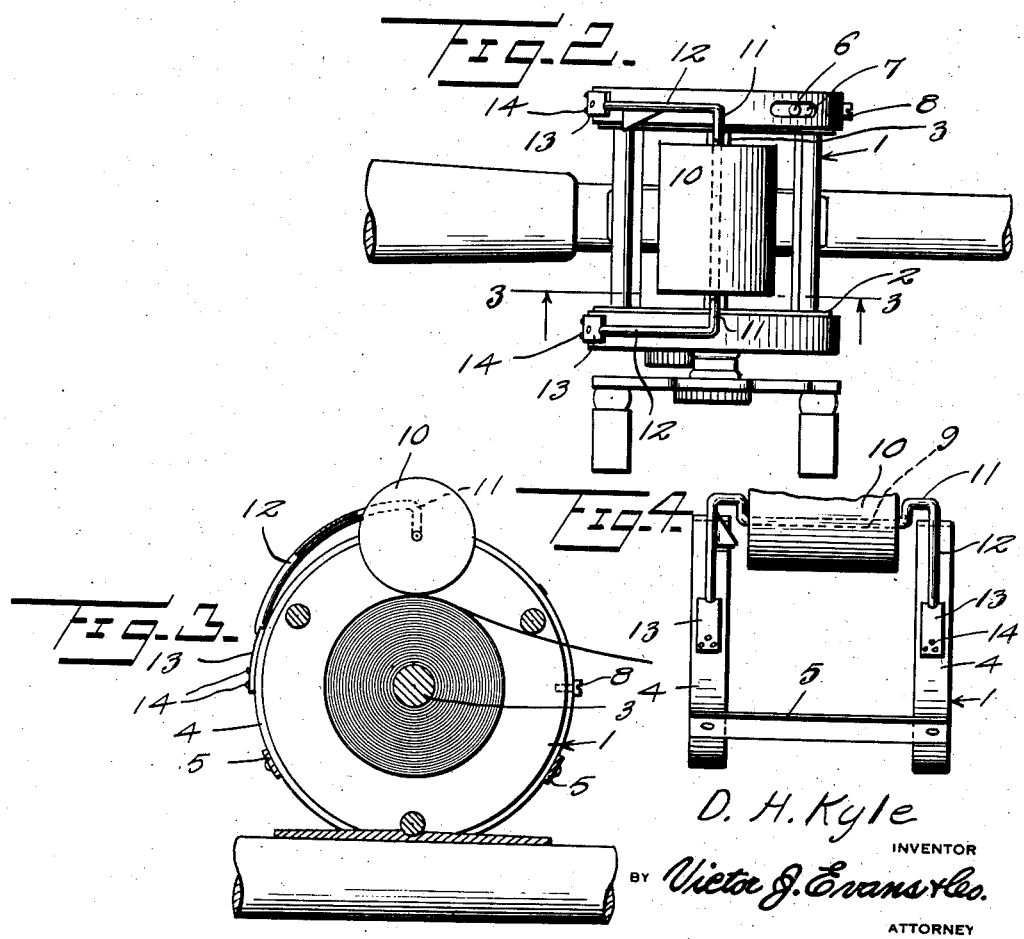
D. H. Kyle
INVENTOR
BY Victor J. Evans & Co.
ATTORNEY Patented Jan. 24, 1939

2,144,984

UNITED STATES PATENT OFFICE 2,144,984

BACKLASH SNUBBER

Dale H. Kyle, Edgerton, Ohio

Application January 30, 1937, Serial No. 123,265

3 Claims. (Cl. 242—84.5)

This invention relates to backlash snubbers for fishing reels and has for the primary object the provision of a device of this character which will prevent a fishing line when casting from loosening from a reel spool by centrifugal force due to the rotation of the spool and which is the primary cause of backlash.

Another object of this invention is the provision of means whereby the device may be readily adjusted on the reel to compensate for heavy and light weight lines and also to direct the usual running loop of the line upward and forward of the reel away from the latter to prevent the loop from catching and winding on the reel.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a fishing reel mounted on a pole and equipped with a backlash snubber constructed in accordance with my invention.

Figure 2 is a top plan view illustrating the same.

Figure 3 is a sectional view taken on the line 3—3 of Figure 2.

Figure 4 is a rear elevation illustrating the snubber.

Referring in detail to the drawing, the numeral 1 indicates a conventional type of fishing reel including the usual disk-shaped portions 2. The disk-shaped portions form the journals for the spool 3 and other parts which go to make up the reel. This construction described forms no part of the present invention but simply is referred to to clearly set forth hereinafter the association of the present invention with the reel.

Annular bands 4 are mounted on the disk-shaped portions 2 of the reel and are joined together by spaced braces 5 located forwardly and rearwardly of the base of the reel, as clearly shown in Figure 3. A pin 6 is carried by one of the annular portions 2 of the reel and fits in a slot 7 formed in one of the bands 4 for the purpose of limiting the rotation of the bands on the reel. A set bolt 8 is carried by one of the bands and may be turned in engagement with the reel for the purpose of securing the bands in any of their adjusted positions. It is to be understood that the bands move simultaneously when adjusted on the reel due to the fact that they are connected by the braces 5.

A shaft 9 has a roller 10 journaled thereon and said roller is limited in its endwise movement on the shaft by offset portions 11 forming an integral part of the shaft. Integral with the offset portions 11 are arms 12 and they in turn are secured to springs 13 of the leaf type. The springs are riveted or otherwise secured to the bands 4, as shown at 14. The springs act to urge the roller 10 in engagement with the fishing line wound upon the spool 3, as shown in Figure 3. The roller engages the line from the top side of the reel and as the bands are adjustable for a limited distance circumferentially of the annular portions 2 of the reel the roller may be shifted from the top center position to the rear of said top center position towards the butt or handle of the fishing rod, as shown in Figure 3. Said adjustment of the roller from the top center of the reel spool is to permit the device to be successfully operated with lines of different gages or sizes in diameter and to prevent the usual running loop of the line from mounting vertically and falling upon the rotating spool of the reel. The roller bears against the line while wound on the spool and acts to maintain the line taut on the spool at all times preventing the line windings from becoming loose on the spool and being thrown in suspension by centrifugal action. The loop in the line if permitted to be thrown by centrifugal action will fall upon the rotating reel or spool and become entangled with the windings thereon.

The line unwinding from the spool faster than the line plays out from the pole causes what is termed a running loop in the line where said line leaves the spool and in a direction other than the direction of the line of travel of the line when leaving the pole. With this invention adapted to a reel it requires less skill on the part of a person in making a successful cast as all liability of the line becoming snarled or entangled is obviated and further provides a device which may be readily adjusted to compensate for different gage lines and also may be readily adapted to a conventional type of reel.

Having described the invention, I claim:

1. In combination with a fishing reel including disk-shaped portions and a spool and a line wound on said spool, a roller to contact with the line adjacent where it leaves the spool, connected bands mounted on said disk-shaped portions having limited rotation relative to said portions about the centers thereof, and means connected to said bands to form a journal for said roller and acting to urge the roller towards the spool.

2. In combination with a fishing reel including disk-shaped portions and a spool and a line wound on said spool, a roller to contact with the line adjacent where it leaves the spool, connected bands mounted on said disk-shaped portions for a limited rotation relative to said portions about the centers thereof, a shaft having the roller journaled thereon, arms formed on said shaft, leaf springs connecting said arms to the bands and acting to urge the roller towards the spool.

3. In combination with a fishing reel including disk-shaped portions and a spool and a line wound on said spool, a roller to contact with the line adjacent where it leaves the spool, connected bands mounted on said disk-shaped portions for a limited rotation relative to said portions about the centers thereof, a shaft having the roller journaled thereon, arms formed on said shaft, leaf springs connecting said arms to the bands and acting to urge the roller towards the spool, and means for releasably securing one of the bands on one of the disk-shaped portions.

DALE H. KYLE.